(12) United States Patent
Ryo (10) Patent No.: US 9,601,078 B2
(45) Date of Patent: Mar. 21, 2017

(54) ELECTRONIC DEVICE AND IMAGE DATA OUTPUT PROCESSING METHOD

(71) Applicant: NEC Corporation, Minato-ku, Tokyo (JP)

(72) Inventor: Sho Ryo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/772,102

(22) PCT Filed: Feb. 18, 2014

(86) PCT No.: PCT/JP2014/053747
§ 371 (c)(1),
(2) Date: Sep. 2, 2015

(87) PCT Pub. No.: WO2014/136564
PCT Pub. Date: Sep. 12, 2014

(65) Prior Publication Data
US 2016/0035311 A1    Feb. 4, 2016

(30) Foreign Application Priority Data

Mar. 6, 2013    (JP) .................. 2013-044381

(51) Int. Cl.
*H04M 1/72* (2006.01)
*G09G 5/00* (2006.01)
*H04M 1/725* (2006.01)

(52) U.S. Cl.
CPC .......... *G09G 5/003* (2013.01); *H04M 1/7253* (2013.01); *H04M 1/72527* (2013.01); *H04M 1/72597* (2013.01)

(58) Field of Classification Search
CPC .......................... G09G 5/003; G06K 9/00711

USPC ........... 455/550.1, 556.2, 557, 566, 90.1, 95
See application file for complete search history.

(56) References Cited

U.S. PATENT DOCUMENTS

| 6,236,392 B1* | 5/2001 | Inamori | G09G 5/12 345/204 |
| 6,922,202 B2* | 7/2005 | Shigeta | H04L 29/06 345/156 |
| 2013/0156406 A1* | 6/2013 | Takagi | G06K 9/00765 386/278 |

FOREIGN PATENT DOCUMENTS

| JP | 2005-130132 A | 5/2005 |
| JP | 2006-262190 A | 9/2006 |
| JP | 2010-183532 A | 8/2010 |
| JP | 2010-283519 A | 12/2010 |
| WO | 2012/165119 A1 | 12/2012 |

OTHER PUBLICATIONS

International Search Report for PCT Application No. PCT/JP2014/053747, mailed on Apr. 8, 2014.

* cited by examiner

*Primary Examiner* — John J Lee (57) ABSTRACT

An electronic device includes an image data acquisition part configured to acquire image data, and an image output processor configured to output image data to an external display device, wherein, when an interrupt event occurs while the image output processor outputs image data to the external display device, the image output processor selects or refuses a plurality of information relating to an interrupt event based on at least one of the attribute of an interrupt event and the attribute of the external display device, thus outputting the selected information to the external display device.

8 Claims, 7 Drawing Sheets

FIG. 9

ELECTRONIC DEVICE AND IMAGE DATA OUTPUT PROCESSING METHOD

This application is a National Stage Entry of PCT/JP2014/053747 filed on Feb. 18, 2014, which claims priority from Japanese Patent Application 2013-044381filed on Mar. 6, 2013, the contents of all of which are incorporated herein by reference, in their entirety.

TECHNICAL FIELD

The present invention relates to an electronic device, an image data output processing method, and a program.

BACKGROUND ART

Various technologies have been proposed with respect to display operations of mobile phones and smart phones upon receiving incoming calls.

Although incoming-call screens normally include originator information, for example, users may not want other people to know privacy-related information, such as phone numbers of originators and any information identifying originators, under certain circumstances.

Relating to the above, Patent Literature Document 1 discloses a communication terminal in which concealed-display conditions and marks identifying originators are set to a storage unit in advance. Upon receiving an incoming call satisfying the concealed-display condition, the communication terminal notifies a user of an incoming call by using marks instead of using the information of concealing persons stored in the storage unit or the originator information registered in an address book in a concealment setting. Upon receiving an operation to release display concealment, the communication terminal switches to the normal display to notify a user of an incoming call.

Upon sending a call or receiving an email, the communication terminal of Patent Literature Document 1 is able to prevent information leakage even when other people view an incoming-call display with a communication terminal having a function of displaying the originator information.

Upon receiving an incoming call, a mobile phone, currently used to display video content, may cause a risk of interrupting the displayed video content by displaying an incoming-call screen.

Relating to the above, a mobile phone of Patent Literature Document 2 is designed to divide the screen into two subsections based on a dividing ratio stored in a dividing information storage unit when receiving an external event via a communication part with a controller while displaying a video of a television program received via a tuner, and therefore it can display the video of a television program, information indicating the occurrence of an external event, and information concerning an originator.

Thus, the mobile phone of Patent Literature Document 2 is able to notify a user of an incoming call, such as a phone call or an electronic mail, without interrupting the displayed video while displaying the received video.

CITATION LIST

Patent Literature Document

Patent Literature Document 1: Japanese Patent Application Publication No. 2010-183532

Patent Literature Document 2: Japanese Patent Application Publication No. 2005-130132

SUMMARY OF INVENTION

Technical Problem

Both the communication terminal of Patent Literature Document 1 and the mobile phone of Patent Literature Document 2 are not designed to consider the situation in which image data are output to an external display device such as a monitor. When a user connects a mobile phone to a monitor so as to watch video content together with other people such as friends and members of a family, for example, friends or members of a family may easily grasp the information displayed on the monitor. This may cause a problem when an incoming-call screen displayed on the monitor shows information which the originator or the user of a mobile phone does not want other people to know.

For this reason, it is necessary to appropriately control display operations, concerning interrupt events such as incoming calls, by paying careful attention to privacy when an electronic device such as a mobile phone and a smart phone outputs image data to an external display device.

The present invention aims to provide an electronic device, an image data output processing method, and a program, which can solve the above problem.

Solution to Problem

According to one aspect of the present invention, an electronic device includes an image data acquisition part configured to acquire image data, and an image output processor configured to output image data to an external display device, wherein, when an interrupt event occurs while the image output processor outputs the image data to the external display device, the image output processor selects or refuses a plurality of information relating to an interrupt event based on at least one of the attribute of an interrupt event and the attribute of the external display device, thus outputting the selected information to the external display device.

According to another aspect of the present invention, an image data output processing method adapted to an electronic device includes an image data acquisition step of acquiring image data; an image output processing step of outputting image data to an external display device; and a step of selecting or refusing a plurality of information relating to an interrupt event based on at least one of the attribute of an interrupt event and the attribute of the external display device when an interrupt event occurs while image data is being output to the external display device, thus outputting the selected information to the external display device.

According to a further aspect of the present invention, a program causes a computer controlling an electronic device to execute an image data acquisition step of acquiring image data; an image output processing step of outputting image data to an external display device; and a step of selecting or refusing a plurality of information relating to an interrupt event based on at least one of the attribute of an interrupt event and the attribute of the external display device when an interrupt event occurs while image data is being output to the external display device, thus outputting the selected information to the external display device.

Advantageous Effects of Invention

According to the present invention, it is possible to appropriately control display operations, concerning interrupt events, when an electronic device outputs image data to an external display device.

DESCRIPTION OF EMBODIMENTS

Hereinafter, the embodiment of the present invention will be described with reference to the drawings. The following description refers to an example of the present invention applied to a mobile terminal device. Herein, mobile terminal device is a generic term for mobile phones and smart phones. However, the applied field of the present invention is not necessarily limited to mobile terminal devices. That is, the present invention is applicable to various types of electronic devices which can output image data to external devices and which may undergo interrupt events.

For example, the electronic device of the present invention may refer to various types of information processing devices (e.g. computers and mobile information terminals (Personal Digital Assistant; PDA)), having email functions and image playback functions, which can output image data to external devices. Alternatively, the electronic device of the present invention may refer to game devices, having schedule managing functions (or functions of managing users' schedules), which can output image data to external devices.

Figure 1:
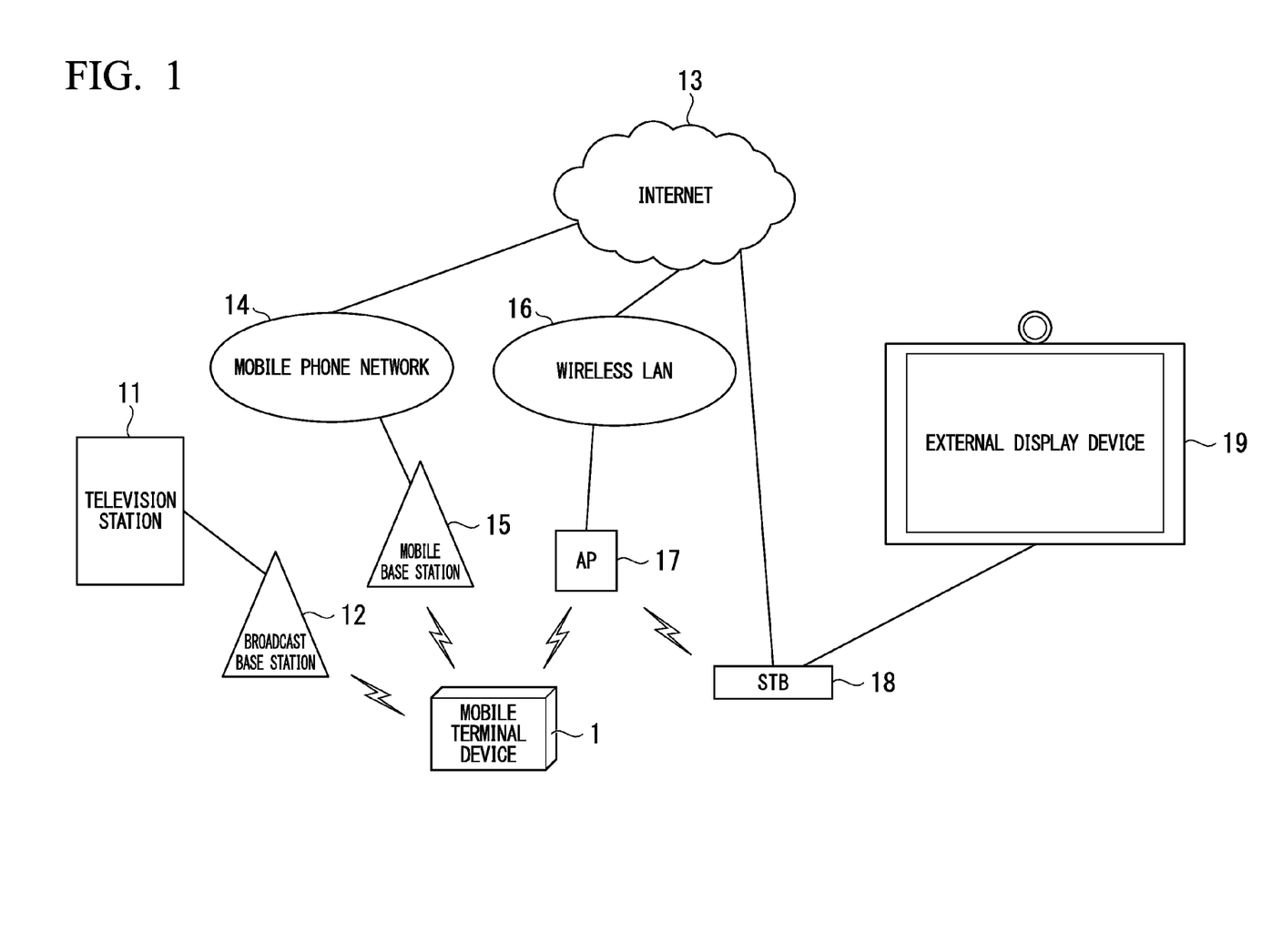
FIG. 1 is a schematic diagram showing an example of the usage environment of a mobile terminal device according to one embodiment of the present invention.

FIG. 1 is a schematic diagram showing an example of the usage environment of the mobile terminal device according to one embodiment of the present invention. In FIG. 1, a television station 11 controls a broadcast base station 12 to transmit broadcast content (specifically, television programs) on broadcast waves. A mobile terminal device 1 obtains broadcast content by receiving broadcast waves.

Herein, the content refers to any images, sounds, or combinations of sounds and images, which can be rendered in a human perceptual manner. The broadcast content refers to any content transmitted via broadcasting. Hereinafter, the content including any image will be referred to as "video content".

The mobile terminal device 1 wirelessly communicates with the mobile base station 15 so as to access the Internet 13 or a mobile phone network (i.e. a communication network for mobile terminal terminals provided by common carriers). Additionally, the mobile terminal device 1 wirelessly communicates with an access point (AP) 17 so as to access the Internet 13 or a wireless LAN (Wireless Local Area Network; WLAN) 16.

In particular, the mobile terminal device 1 receives calls (or incoming calls), such as voice communications and videophone communications sent (or transmitted) by other phones (e.g. mobile terminal devices or fixed-line phones), by way of the mobile base station 15.

Additionally, the mobile terminal device 1 receives emails transmitted by other electronic devices by way of the mobile base station 15 or the access point 17.

The mobile terminal device 1 displays images on an external display device 19 by transmitting image data to the external display device 19 by way of the access point 17, the wireless LAN 16, the Internet 13, and a set top box (STB) 18.

The external display device 19 includes a display screen, such as a liquid crystal display panel, a plasma display panel (PDP), and an LED (Light-Emitting Diode) panel, and speakers. The external display device 19 displays or produces images or sounds output (or transmitted) from another electronic device such as the mobile terminal device 1.

The external display device 9 is equipped with touch sensors on the display screen; hence, a touch panel is formed using the display screen and touch sensors. The external display device 1 detects a user's operation (i.e. a touch operation) using a touch sensor. In this connection, it is possible for the external display device 19 to use a remote controller used to receive a user's operation or other operational devices used to receive user's operations in addition to or instead of touch sensors.

The external display device 19 is equipped with a camera. In a videophone communication, the external display device 19 takes a caller's image with the camera. Additionally, the external display device 19 has a microphone. In a videophone communication, the external display device 19 inputs a caller's speech with the microphone. Then, the external display device 19 transmits the caller's image and the caller's speech to the mobile terminal device 1.

Upon receiving an inquiry about the installation position of the external display device 19 from the mobile terminal device 1, the external display device 19 retrieves the installation position information so as to reply to the inquiry. For example, the external display device 19 activates the GPS (Global Positioning System) function to retrieve the installation position information representing the positional information thereof. Alternatively, the external display device 19 may obtain the installation position information thereof by use of another electronic device such as a management server. Moreover, the external display device 19 may receive and store the installation position information input by a user's operation so as to read the installation position information.

In this connection, the external display device 19 needs at least the function of obtaining image data from other electronic devices and displaying images; hence, other functions are not essential. For example, the external display device 19 does not need a camera, a microphone, and a function of obtaining the positional information thereof.

The external display device 19 is a device used to display images on an external screen positioned outside of the mobile terminal device 1; hence, the external display device 19 can be incorporated into the mobile terminal device 1. For example, the external display device 19 may be a projector installed in the mobile terminal device 1. In this case, the external display device 19 projects images on a screen positioned outside of the mobile terminal device 1, thus displaying images outside the mobile terminal device 1.

FIG. 1 shows an example of the usage environment; hence, this is not a restriction. It is necessary to establish any environment in which the mobile terminal device 1 can transmit image data to the external display device 19.

For example, the mobile terminal device 1 does not need to install the function of receiving broadcast waves. Additionally, the mobile terminal device 1 does not need to install the function of accessing the Internet 13 and the wireless LAN 16 when the mobile terminal device 1 directly communicates with the external display device 19. As described above, the present invention is applicable to any electronic devices other than mobile terminal devices, wherein those electronic devices do not need to install the function of accessing the mobile phone network 14.

The connection path between the mobile terminal device 1 and the external display device 19 is not necessarily limited to the paths through the access point 17, the wireless LAN 16, the Internet 13, and the set top box 18 shown in FIG. 1. For example, the mobile terminal device 1 may directly communicate with the external display device 19 via wired communications or wireless communications.

Additionally, the mobile terminal device 1 may directly communicate with the set top box 18 via wired communications or wireless communications when the mobile terminal device 1 communicates with the external display device 19 by way of the set top box 18.

Alternatively, the access point 17 may directly communicate with the set top box 18 via wired communications or wireless communications. Therefore, the mobile terminal device 1 may communicate with the set top box 18 without going through the Internet 13 and the wireless LAN 16.

Additionally, the mobile terminal device 1 and the set top box 18 may communicate with each other by accessing the wireless LAN 16 through the different access points 17.

It is possible to use various communication methods with respect to the communication method applied between the set top box 18 and the external display device 19 similar to the communication method applied between the mobile terminal device 1 and the set top box 18.

Figure 2:
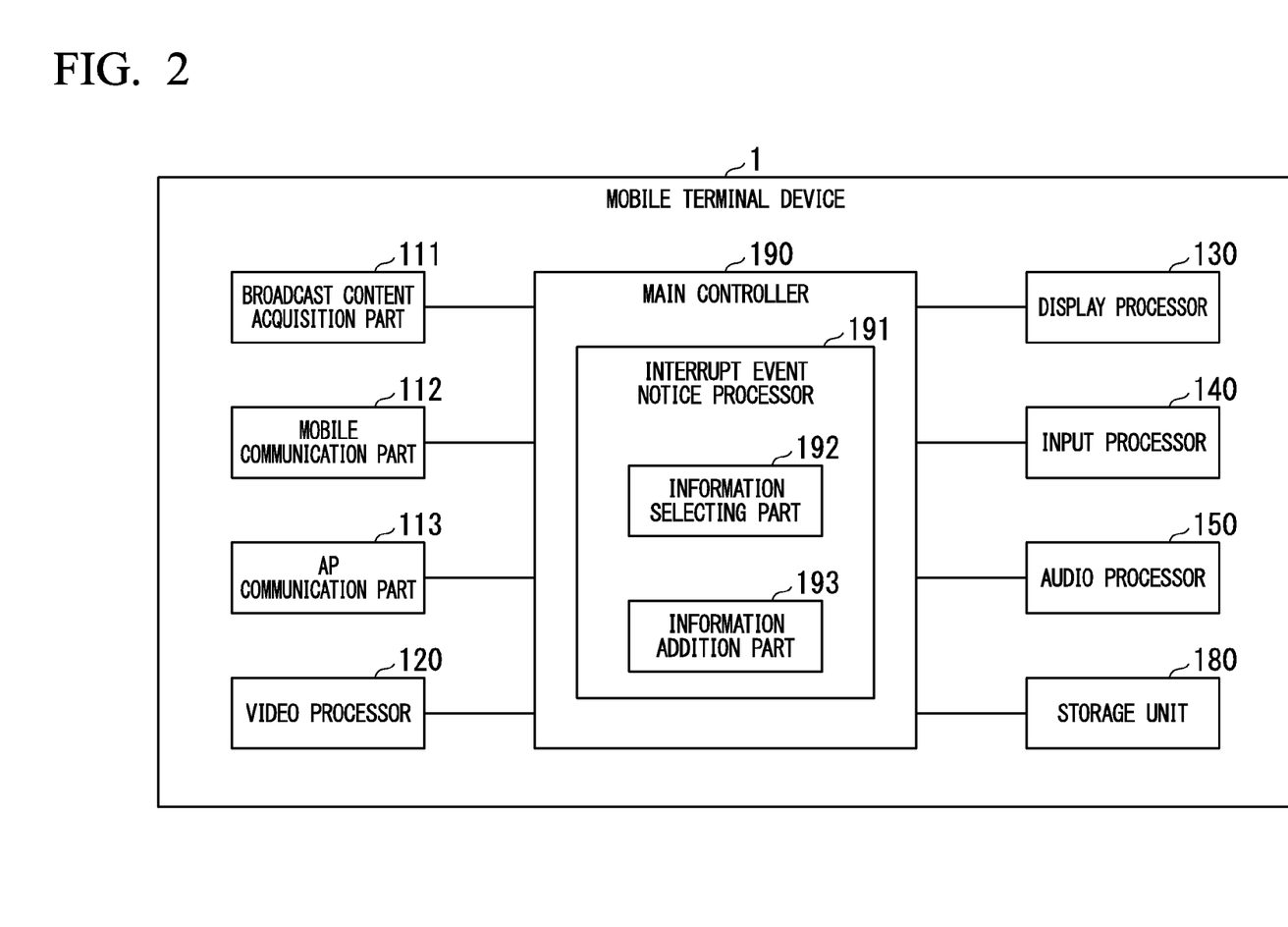
FIG. 2 is a block diagram showing the mobile terminal device of the embodiment.

FIG. 2 is a block diagram showing the functional configuration of the mobile terminal device 1. In FIG. 2, the mobile terminal device 1 includes a broadcast content acquisition part 111, a mobile communication part 112, an AP communication part 113, a video processor 120, a display processor 130, an input processor 140, an audio processor 150, a storage unit 180, and a main controller 190. The main controller 190 includes an interrupt event notice processor 191. The interrupt event notice processor 191 includes an information selecting part 192 and an information addition part 193.

The broadcast content acquisition part 111 having a tuner circuit for television broadcast waves receives broadcast waves from a broadcast base station 12 (FIG. 1) so as to carry out demodulation and decoding processes on broadcast waves, thus acquiring broadcast content. The broadcast content acquisition part 111 acquires broadcast content including image data; hence, the broadcast content acquisition part 111 servers as an example of an image data acquisition part.

The mobile communication part 112 having a communication circuit for mobile communications communicates with the mobile base station 15 so as to access the mobile telephone network 14 and the Internet 13. In particular, the mobile communication part 112 receives a voice communication (or an incoming call), sent (or transmitted) from another phone device, by way of a call signal from the mobile base station 15. Additionally, the mobile communication part 112 receives emails, transmitted from another electronic device, through the mobile base station 15. The mobile communication part 112 receives voice communications or emails, which may exemplify interrupt events (in particular, interrupt events occurring based on data supplied from other devices positioned externally of the mobile terminal device 1).

The AP communication part 113 having a communication circuit for accessing LANs communicates with the access point 17 so as to access the wireless LAN 16 and the Internet 13. In particular, the AP communication part 113 receives emails, transmitted from other electronic devices, through the access point 17. Similar to the mobile communication part 112, the AP communication part 113 receives emails, which may exemplify interrupt events (in particular, interrupt events occurring based on data supplied from other devices positioned externally of the mobile terminal device 1).

Upon receiving a user's operation specifying image data to be output to an external device, the AP communication part 113 transmits the specified image data to the external display device 19. Specifically, the AP communication part 113 transmits image data to the external display device 19 by way of the access point 17, the wireless LAN 16, the Internet 13, and the set top box 18, thus controlling the external display device 19 to display images.

The video processor 130 having a camera takes moving images and still images so as to produce image data. The video processor 120 serves as an example of an image data acquisition part.

The display processor 130 having a display screen such as a liquid crystal panel or an organic EL (Organic Electro Luminescence) panel displays various images such as moving images, still images, and text messages (or characters). For example, the display processor 130 displays images of broadcast content acquired by the broadcast content acquisition part 111, emails received by the mobile communication part 112 or the AP communication part 113, an incoming-call screen activated upon receiving an incoming call indicating a voice communication, or images taken by the video processor 120.

The input processor 140 includes touch sensors disposed on the display screen of the display processor 130, and therefore a touch panel is formed using the display screen and touch sensors. The input processor 140 detects user's operations (i.e. touch operations) with touch sensors. For example, the input processor 140 detects a call-response operation (or a conversation starting operation) in response to a touch operation applied to the incoming-call screen displayed by the display processor 130.

In this connection, the input processor 140 can be associated to other operational devices, e.g. push buttons such as ten-keys and directional keys, in addition to or instead of touch sensors.

The audio processor 150 is equipped with a speaker used to produce sound or a microphone used to input surrounding sound. For example, the audio processor 150 outputs a communicator's speech during voice communications or sound of broadcast content acquired by the broadcast content acquisition part 111. Additionally, the audio processor 150 inputs a user's speech of the mobile terminal device 1 during voice communications.

The storage unit 180 configured to store various data is embodied using a storage device installed in the mobile terminal device 1.

For example, the storage unit 180 stores address data used for address book functions, such as names, phone numbers, email addresses, and attributes (e.g. classifications of groups such as families, relatives, friends, and colleagues), for each registrant.

The storage unit 180 stores user's schedule data of the mobile terminal device 1 as well. The main controller 190 executes schedule book functions using schedule data.

Additionally, the storage unit 180 stores the broadcast content, acquired by the broadcast content acquisition part 111, for use in a time-shift playback (in which the broadcast content is being recorded but played back at a delayed time).

The storage unit 180 stores image data corresponding to images taken by the video processor 120.

The main controller 190 controls various parts of the mobile terminal device 1 so as to carry out various functions. For example, the main controller 190 is embodied using a CPU of the mobile terminal device 1 which executes OS (Operating System) and application programs read from the storage unit 180.

In particular, the main controller 190 acquires image data by reading image data (i.e. content data including image data) from the storage unit 190 in order to play back the video content stored in the storage unit 180. The main controller 190 serves as an example of an image data acquisition part.

Due to the occurrence of the predetermined interrupt event, the interrupt event notice processor 191 carries out a process of notifying the predetermined interrupt event to the mobile terminal device 1.

The predetermined interrupt event may be any interrupt event occurring based on external data supplied from an external device outside the mobile terminal device 1 or any interrupt event occurring based on internal data supplied from an internal circuit of the mobile terminal device 1.

Hereinafter, any interrupt event occurring based on external data supplied from an external device outside the mobile terminal device 1 will be referred to as an "external interrupt event". In contrast, any interrupt event occurring based on internal data supplied from an internal circuit of the mobile terminal device 1 will be referred to an "internal interrupt event".

As examples of external interrupt events, it is possible to name incoming calls of voice communications, incoming calls of videophones, received emails, new posting of SNS (Social Network Service), and new submissions of news.

As examples of internal interrupt events, it is possible to name alarms occurring at times set to schedule book functions.

When an interrupt event occurs while image data is being output (or transmitted) to the external display device 19, the information selecting part 192 selects or refuses a plurality of information relating to an interrupt event based on at least one of the attribute of an interrupt event and the attribute of the external display device 19.

As examples of attributes of external interrupt events, it is possible to name the relationship between the user of the mobile terminal device 1 and the counterpart communicator (e.g. any distinction such as family, friends, colleagues, and business associates) and communicator's secrecy (e.g. any person subjected to a secret setting with address book functions or the like).

The secret setting is a setting which makes it difficult for other persons to know information. For example, the mobile terminal device 1 does not display any item subjected to the secret setting in the normal display operation.

As an example of attributes of internal interrupt events, it is possible to name confidentiality of scheduling contents (e.g. any content subjected to the secret setting in schedule book functions).

As examples of attributes of the external display device 19, it is possible to name various types of usages of the external display device 19 such as family use, company use, and event use. Alternatively, it is possible to use the installation position and the owner of the external display device 19 as attributes of the external display device 19.

Additionally, it is possible to use various types of information identifying the external display device 19 as the basis of identifying attributes of the external display device 19.

As the information identifying the external display device 19, for example, it is possible to use a device ID (e.g. a model number and a serial number) for each unit of the external display device 19. In this case, the storage unit 180 stores the device ID in connection with the usage of the external display device 19 in advance.

Alternatively, it is possible to use the installation position information of the external display device 19. In this case, the storage unit 180 stores the installation position of the external display device 19 in connection with the usage of the external display device 19 in advance. As the method of obtaining the installation position information of the external display device 19, it is possible to use various methods such as the method using the foregoing GPS function, the method of obtaining the information from another electronic device, and the method of obtaining the information via a user's operation.

The information selecting part 192 may select or refuse a plurality of information relating to any interrupt event depending on attributes of images.

As examples of attributes of images, it is possible to name types of images (e.g. types of movies, sports, animations, dramas, moving images for presentations, and company files), age limit information or age qualification information (e.g. demography information such as usages for children, general consumers, and adults).

The attributes of images may be stored in folders. For example, it is possible to classify and store image data in folders relating to movies, sports, animation, dramas, moving images for presentations, secret data, family photos, and family movies.

When the information selecting part 192 selects or refuses a plurality of information relating to an external interrupt event upon occurrence of an external interrupt event, for example, it is possible to determine whether or not to display an incoming-call notice on the external display device 19 upon receiving a phone call based on the attribute of an originator.

For example, it is assumed that any member of a family may be watching an animation film on the external display device 19 which displays an animation film for children. Upon receiving a phone call from any relative under this condition, the information selecting part 192 selects the information relating to an interrupt event such as the originator's information representing an originator's name, a phone number, and a facial photo. Subsequently, the external display device 19 displays the information selected by the information selecting part 192 in addition to the animation film.

Thus, members of a family watching the animation film can recognize an incoming call from any relative. Therefore, any member of a family who wants to talk with the relative (or the originator) gets a chance to talk with the relative.

For example, it is assumed that the user and any colleague of a company may be watching a presentation on the external display device 19 which displays moving images of a presentation in business. Upon receiving a phone call from any relative of the user of the mobile terminal device 1 under this condition, the information selecting part 192 does not display an incoming-call notice without selecting any information relating to an interrupt event.

Alternatively, it is possible to display an incoming-call notice without causing any trouble in business such that the external display device 19 displays a message of "incoming call".

Upon receiving a phone call from any colleague of a company when the external display device 19 displays moving images for a presentation in business, the information selecting part 192 selects the information relating to an interrupt event, i.e. the originator's information such as the name of an originator, a phone number, and a facial photo. Subsequently, the external display device 19 displays the information selected by the information selecting part 192 in addition to moving images (for a presentation).

Thus, all people watching moving images can recognize an incoming call from any colleague of a company.

Therefore, any person who wants to talk with the colleague of a company (or the originator) gets a chance of talking with the colleague of a company.

When the information selecting part 192 selects or refuses a plurality of information relating to an internal interrupt event upon occurrence of an internal interrupt event, for example, it is possible to determine whether or not to display a time-coming notice, depending on a schedule attribute, on the external display device 19 when it comes to the time registered in the schedule book function.

For example, it is assumed that each user may check a schedule which each user does not want other people to know when it comes to the time of a schedule subjected to a secret setting. In this case, the information selecting part 192 does not select any information relating to an interrupt event while the external display device 19 does not display a time-coming notice.

Alternatively, it is possible to solely display a time-coming notice without displaying any content of a schedule such that the external display device 19 displays a message of "alarm time".

When it comes to a time of a schedule not subjected to a secret setting, the information selecting part 192 selects the information relating to an interrupt event, i.e. the information representing the content of a schedule and the registered time. Subsequently, the external display device 19 displays the information selected by the information selecting part 192 in addition to the video content currently being displayed.

This makes it possible for the user of the mobile terminal device 1 to recognize the content of a schedule, and therefore the user may take an appropriate action suiting to a schedule with ease.

When the information selecting part 192 selects the specific information relating to an interrupt event among a plurality of information relating to an interrupt event, for example, it is possible to select the information depending on whether or not a schedule is subjected to a secret setting. Similarly, it is possible for the information selecting part 192 to determine whether or not to select the name of an originator, a phone number, or a facial photo depending on whether or not the originator's information is subjected to a secret setting in the address book function upon receiving a phone call.

When the information selecting part 192 selects or refuses a plurality of information relating to an interrupt event based on the attribute of the external display device 19, for example, it is possible to determine whether or not to display an incoming-call notice on the external display device 19 based on the installation position or the usage of the external display device 19 upon receiving a phone call.

For example, it is assumed that only the user of the mobile terminal device 1 or the user together with another member of a family may be watching the video content on the external display device 19 which is the external display device 19 installed in the user's house. In this case, the user of the mobile terminal device 1 may have no problem even when another member of a family unexpectedly recognizes an originator.

Upon receiving a phone call under this condition, the information selecting part 192 selects the information relating to an interrupt event, i.e. the originator's information such as the name of an originator, a phone number, and a facial photo. Subsequently, the external display device 19 displays the information selected by the information selecting part 192 in addition to the video content being currently displayed.

Thus, the user of the mobile terminal device 1 can recognize the originator since the external display device 19 displays the originator's information.

For example, it is assumed that the user of the mobile terminal device 1 may be watching the moving-image content in business together with any colleague of a company on the external display device 19 which is the external display device 19 installed in a company. In this case, the external display device 19 does not display an incoming-call notice so as not to cause any trouble in business since the information selecting part 192 does not select any information relating to an interrupt event irrespective of an incoming call.

Alternatively, the external display device 19 may display an incoming-call notice, such as a message of "incoming call", without causing any trouble in business.

It is assumed that the user of the mobile terminal device 1 and somebody other than any member of a family may be watching the video content on the external display device 19 which is installed in the house of a user's acquaintance other than the external display device 19 installed in the user's house and the external display device 19 installed in a company. Additionally, it is assumed that the user of the mobile terminal device 1 may not want any person, other than a family member, to know the originator's information.

In this case, the external display device 19 does not display an incoming-call notice since the information selecting part 192 does not select any information relating to an interrupt event irrespective of an incoming call.

Alternatively, the external display device 19 may display an incoming-call notice, such as a message of "incoming call", precluding the originator's information.

When the information selecting part 192 selects or refuses a plurality of information relating to an interrupt event based on the attribute of the external display device 19 and the attribute of an interrupt event, for example, it is possible to determine whether or not to display an incoming call on the external display device 19 based on the installation position and the attribute of the external display device 19 and the attribute of an originator upon receiving a phone call.

For example, it is assumed that only the user of the mobile terminal device 1 or the user together with any member of a family may be watching the video content on the external display device 19 which is not the external display device 19 installed in the user's house. In this case, the information selecting part 192 selects the information relating to an interrupt event, e.g. the originator's information such as the name of an originator, a phone number, and a facial photo, upon receiving a phone call from any relative. Subsequently, the external display device 19 displays the information selected by the information selecting part 192 in addition to the video content.

Thus, the user of the mobile terminal device 1 can recognize the originator since the external display device 19 displays the originator's information. Additionally, all members of a family can recognize an incoming call from any relative when the user of the mobile terminal device 1 together with members of a family is watching the video content. Therefore, any person who wants to talk with the relative (or the originator) can get a chance of talking with the relative.

In contrast, it is assumed that the user of the mobile terminal device 19 does not want any member of a family to recognize an originator since the originator's information is subjected to a secret setting in the address book function in connection with the external display device 19 installed in the user's house. In this case, the external display device 19 does not display an incoming-call notice since the information selecting part 192 does not select any information relating to an interrupt event.

Alternatively, the external display device 19 may displays an incoming-call notice, such as a message of "incoming call", without causing any trouble in business.

For example, it is assumed that the user of the mobile terminal device 1 together with any colleague of a company may be watching the moving-image content on the external display device 19 which is installed in a company. In this case, the external display device 19 does not display an incoming-call notice since the information selecting part 192 does not select any information relating to an interrupt event irrespective of reception of a phone call from the user's relative.

Alternatively, the external display device 19 may displays an incoming-call notice, such as a message of "incoming call", without causing any trouble in business.

The external display device 19 does not display an incoming-call notice since the information selecting part 192 does not select any information relating to an interrupt event irrespective of an incoming call from any relative of the user of the mobile terminal device 1 when the external display device 19 is installed in the house of a user's acquaintance, in other words, when the external display device 19 differs from the external display device 19 installed in the user's house and the external display device 19 installed in a company.

Alternatively, the external display device 19 may display an incoming-call notice, such as a message of "incoming call", precluding the originator's information.

In the above, the user of the mobile terminal device 1 can make the setting as to on which condition the desired information should be displayed (or whether or not to display the desired information).

The information addition part 193 carries out an addition process (or an image composition process) to add the information selected by the information selecting part 192 to the image data supplied to the external display device 19. At this time, the information addition part 193 may change the manner of displaying the selected information based on the display manner of the external display device 19.

For example, the information addition part 193 adjusts the luminance of an image of the added information (i.e. an image of the information relating to an interrupt event) to be identical or close to the luminance of an original image (i.e. an image of video content). Thus, the information addition part 193 can add the information without destroying an atmosphere of an original image.

Alternatively, it is possible to set the luminance differently to the luminance of an original image by reducing the luminance of the image of the added information to be lower (or darker) than the luminance of the original image. Thus, it is possible to make the added information obvious, and therefore it is possible to reduce a risk of the user overlooking the information.

A combination of the AP communication part 113 and the interrupt event notice processor 191 serves as an example of an image output processor. That is, the information addition part 193 adds the information, which the information selecting part 192 selects from among a plurality of information relating to an interrupt event, to the image data supplied to the external display device 19, and therefore the AP communication part 113 outputs (or transmits) the information to the external display device 19.

In this connection, it is possible to determine various settings with respect to the display operation of the display processor 130 when the external display device 19 displays the video content.

For example, the mobile terminal device 1 may turn off the displayed content (or stops the display operation) with the display processor 130 after transmitting the video content to the external display device 19. Additionally, the display processor 130 may display the information relating to an interrupt event (e.g. the name of an originator, a phone number, and a facial photo upon receiving a phone call) when the display processor 130 detects the occurrence of an interrupt event while transmitting the video content to the external display device 19. Alternatively, the display processor 130 may stop the display operation in connection with the originator's information which is subjected to a secret setting in the address book function.

Figure 3:
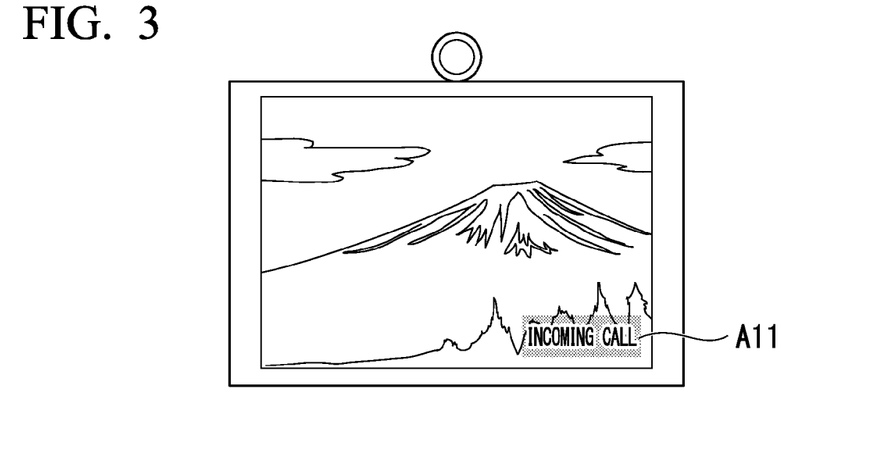
FIG. 3 is a front view of an external display device showing an example of the content displayed on the occurrence of an interrupt event in the embodiment.

FIG. 3 is a schematic drawing showing an example of the displayed content of the external display device 19 due to the occurrence of an interrupt event. FIG. 3 shows an example of the displayed content of the external display device 19 upon receiving a videophone call while the external display device 19 displays the video content supplied from the mobile terminal device 1. The external display device 19 solely displays the calling information in an area A11 without displaying the originator's information such as the name of an originator and a phone number.

Thus, the user of the mobile terminal device 1 can recognize an incoming call while preventing other people watching the external display device 19 from recognizing the originator. When the user of the mobile terminal device 1 does not want his/her acquaintance to know the privacy-related information, such as the name of a communicator and a phone number, while the user and his/her acquaintance are watching a movie, for example, it is possible to determine that the external display device 19 may solely display the information of an incoming call as shown in FIG. 3.

By limiting the amount of incoming-call information displayed on the external display device 19, it is possible to reduce a chance that any person watching the external display device 19 would be hindered from browsing the video content, thus reducing incongruity or discomfort affecting any person watching the external display device 19.

Upon detecting that the mobile terminal device 1 is transmitting image data to the external display device 19 installed in the house of a user's acquaintance, the information selecting part 192 solely selects the incoming-call information, from among a plurality of information relating to an incoming call, the incoming-call information, the name of an originator, and a phone number of an originator, upon receiving a phone call. Subsequently, the information addition part 193 synthesizes a text message, representing the incoming-call information selected by the information selecting part 192, with an image of video content (e.g. a movie), and therefore the external display device 19 displays an image synthesized with the incoming-call information.

In this connection, the user of the mobile terminal device 1 can determine the setting of the mobile terminal device 1 with respect to any condition concerning the external display device 19 installed in the house of a user's acquaintance and the information identifying the external display device 19 installed in the house of a user's acquaintance.

It is possible to add other conditions, such as the condition that the mobile terminal device 1 is transmitting image data to the external display device 19 installed in the user's house in connection with the predetermined type of a movie, in addition to the condition that the mobile terminal device 1 is transmitting image data to the external display device 19 installed in the house of a user's acquaintance.

Additionally, it is possible to determine that the external display device 19 does not display the incoming-call information (but solely displays the video content). Upon detecting that the mobile terminal device 1 is transmitting image data, for use in a presentation in a company, to the external display device 19, for example, the external display device 19 may solely display the video content since the information selecting part 192 does not select any incoming-call information irrespective of the reception of an incoming call.

When the user does not want other people to know the phone number of an originator, the external display device 19 displays the name of an originator without displaying the phone number of an originator. For example, the user of the mobile terminal device 1 may determine the setting as to whether or not to display a phone number for each registrant in the address book function. Due to the setting of disallowing an operation to display the phone number of an originator, the information selecting part 192 may select the name of an originator without selecting the phone number of an originator.

Additionally, it is possible to display the phone number of an originator when the mobile terminal device 1 is transmitting image data to the external display device 19 installed in the user's house. When the mobile terminal device 1 is transmitting image data to the external display device 19 other than the external display device 19 installed in the user's house based on the setting of disallowing an operation to display the phone number of an originator, for example, the information selecting part 192 may select the name of an originator without selecting the phone number of an originator. In contrast, when the mobile terminal device 1 is transmitting image data to the external display device 19 installed in the user's house, the information selecting part 192 may select both the name of an originator and the phone number of an originator irrespective of the setting whether to allow or disallow an operation to display the phone number of an originator.

Figure 4:
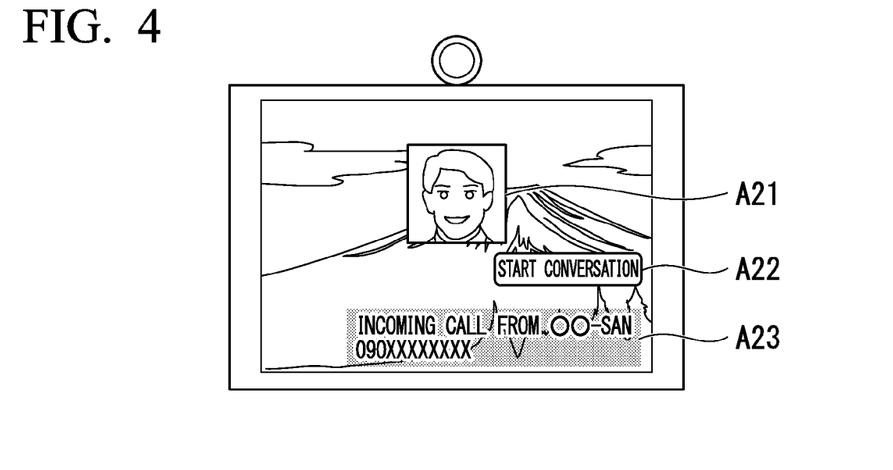
FIG. 4 is a front view of an external display device showing another example of the content displayed on the occurrence of an interrupt event in the embodiment.

FIG. 4 is a schematic drawing showing another example of the displayed content of the external display device 19 due to the occurrence of an interrupt event. FIG. 4 shows an example of the displayed content of the external display device 19 upon receiving a videophone call while the external display device 19 displays the video content supplied from the mobile terminal device 1. The external display device 19 displays a facial photo of an originator in an area A21 while displaying the name and the phone number of an originator in an area A23.

Additionally, the external display device 19 displays a button of "start conversation" in an area A22. When the external display device 19 detects a touch operation applied to the button of "start conversation" with a touch sensor, the mobile terminal device 1 starts a conversation on a videophone by means of the external display device 19.

Specifically, the mobile terminal device 1 transmits image data and audio data, given by a counterpart communicator (or an originator), to the external display device 19, and therefore the external display device 19 displays the image of a counterpart communicator while producing the sound of a counterpart communicator. Additionally, the external display device 1 takes an image of a counterpart communicator with a camera installed therein so as to transmit image data to the mobile terminal device 1 while the external display device 1 inputs the speech of a counterpart communicator with a microphone installed therein so as to transmit audio data to the mobile terminal device 1. Subsequently, the mobile terminal device 1 transmits image data and audio data, supplied from the external display device 19, to an originator's device.

Thus, it is possible to carry out conversations among a plurality of communicators by performing a conversation start operation using the button of "start conversation" displayed in the external display device 19. When the user performs a conversation start operation with the mobile terminal device 1, a person performing the operation (e.g. the user of the mobile terminal device 1) may have a conversation with a single communicator.

The mobile terminal device 1 controls the external display device 19 to display the button of "start conversation" only when the mobile terminal device 1 determines that the originator information (e.g. all of the name, the phone number, and the facial photo of an originator) can be displayed on screen, thus receiving a conversation using the external display device 19.

The external display device 19 stops displaying the video content when the user carries out a conversation on a videophone by use of the external display device 19. At this time, the mobile terminal device 1 records the video content (or it stores the video content in the storage unit 180). Alternatively, the storage unit 180 stores a start position of restarting a playback, i.e. a conversation start time or its preceding playback position, when the mobile terminal device 1 transmits the images stored therein (i.e. the images stored in the storage unit 180) such as images taken by the video processor 120.

After completion of a conversation, the mobile terminal device 1 transmits image data, beginning at the conversation start time or its preceding playback position, to the external display device 19, and therefore the external display device 19 restarts to display the video content. Therefore, the external display device 19 carries out a time-shift playback on the broadcast content.

Thus, any person having a conversation can watch the video content without skipping (or missing) a video during a conversation time since the external display device 19 restarts to display the video content beginning at the conversation start time or its preceding playback position.

In contrast, the mobile terminal device 1 continues to transmit the video content to the external display device 19 when the user of the mobile terminal device 1 carries out a conversation alone. Additionally, the mobile terminal device 1 records the video content (or it stores the video content in the storage unit 180). Alternatively, the storage unit 180 stores a time-shift playback start position, i.e. the conversation start time or its preceding playback position, when the mobile terminal device 1 transmits the images stored therein (i.e. the images stored in the storage unit 180), such as images taken by the video processor 120, to the external display device 19.

After completion of a conversation, the mobile terminal device 1 starts a time-shift playback at the conversation start time or its preceding playback position. Thus, any person having a conversation, who cannot watch the video content during a conversation, can watch the video content without skipping a video during a conversation time.

In the time-shift playback, the mobile terminal device 1 displays subtitles without outputting an audio. This may prevent the sound output from the external display device 19 from being interfered with (or superimposed on) an audio.

Figure 5:
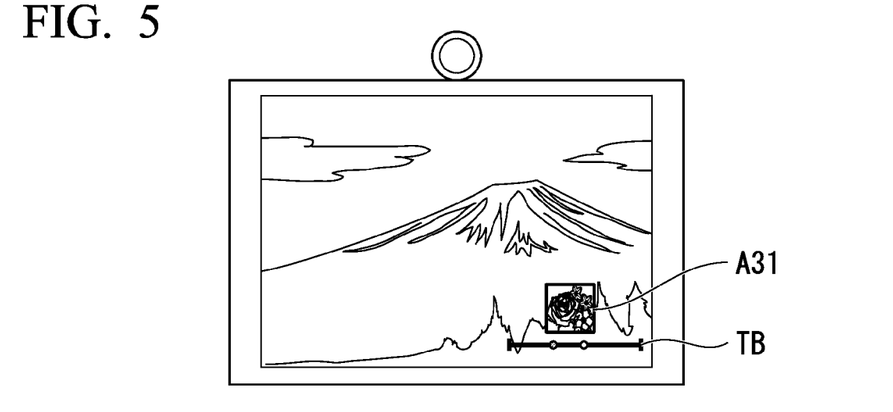
FIG. 5 is a front view of an external display device showing an example of the content displayed when the mobile terminal device of the embodiment carries out a time-shift playback.

FIG. 5 is a schematic drawing showing an example of the displayed content of the external display device 19 while the mobile terminal device 1 carries out a time-shift playback. In FIG. 5, the external display device 19 displays a time-shift playback status of the mobile terminal device 1 in addition to the video content supplied from the mobile terminal device 1. Specifically, the external display device 19 displays a reduced playback image of the mobile terminal device 1 in the area A31 while displaying a time bar TB.

In the time-shift playback of the mobile terminal device 1, for example, the information addition part 193 synthesizes a reduced playback image of the mobile terminal device 1 and an image of the time bar TB with an image corresponding to the image data supplied to the external display device 19, and therefore the external display device 19 displays all the images together.

Figure 6:
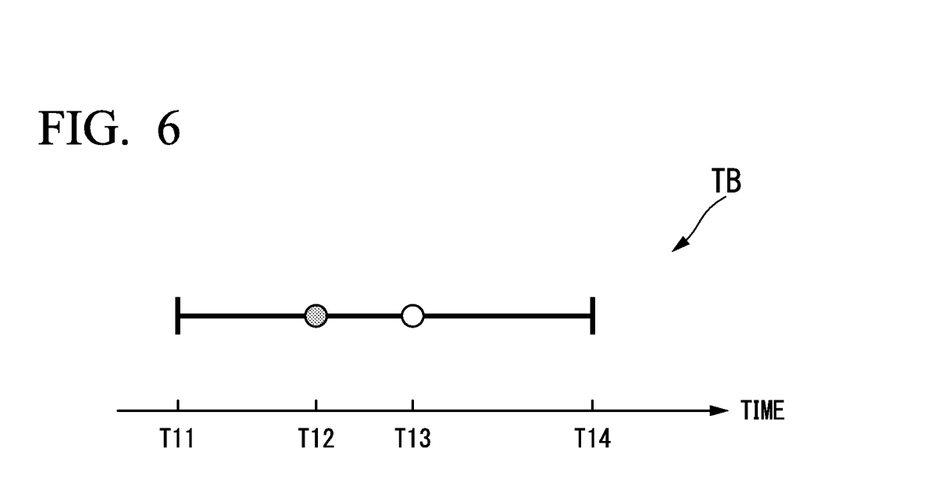
FIG. 6 is a front view showing an example of a time bar displayed on an external display device in the embodiment.

FIG. 6 is a schematic drawing showing an example of the time bar TB displayed on the external display device 19. In FIG. 6, T11 indicates a content playback start position, while T14 indicates a content playback end position. Additionally, T12 indicates a playback position of the mobile terminal device 1, while T13 indicates a playback position of the external display device 19. Due to the time-shift playback of the mobile terminal device 1, the playback position (time T12) of the mobile terminal device 1 precedes the playback position (time T13) of the external display device 19.

When it is uncertain to determine the playback end position of the broadcast content, the external display device 19 displays the time bar TB indicating the content playback start position (time T11), the playback position (time T12) of the mobile terminal device 1, and the playback position (time T13) of the external display device 19.

Upon completion of the time-shift payback of the mobile terminal device 1, the external display device 19 stops displaying the time-shift playback status with the mobile terminal device 1.

When the user of the mobile terminal device 1 carries out a time-shift playback end operation, for example, the mobile terminal device 1 stops the time-shift playback, and therefore the external display device 19 stops displaying the time-shift playback status with the mobile terminal device 1.

The playback position of the mobile terminal device 1 may approach the playback position of the external display device 19 when the mobile terminal device 1 carries out a double-speed playback, in other words, when the playback speed of the mobile terminal device 1 is higher than the playback speed of the external display device 19. Then, the mobile terminal device 1 stops the time-shift playback when the playback position of the mobile terminal device 1 catches up with the playback position of the external display device 19, and therefore the external display device 19 stops displaying the time-shift playback status of the mobile terminal device 1. In this case, any person who watches the video content with the mobile terminal device 1 can watch the video content of the external display device 19 afterwards.

By displaying the time-shift playback status of the mobile terminal device 1 on the external display device 19, the user of the mobile terminal device 1 watching the video content can recognize a time difference between the playback position of the mobile terminal device 1 and the playback position of the external display device 19; hence, the user may determine whether or not to switch to the viewing with the external display device 19 with reference to the time difference.

In this connection, it is possible to modify the present embodiment such that the external display device 19 does not display the time-shift playback status of the mobile terminal device 1 but the external display device 19 displays either a reduced playback image of the mobile terminal device 1 or the time bar TB.

Alternatively, the mobile terminal device 1 (specifically, the display processor 130) may display the time-shift playback status of the mobile terminal device 1. In this case, any person who watches the video content cannot obtain any additional information even when the mobile terminal device 1 reduces and displays the playback image thereof. For this reason, it is possible to modify the present embodiment such that the mobile terminal device 1 solely adds the time bar TB to the video content so as to display them together.

The above description refers to operations using a videophone, but similar operations can be applied to voice communications.

Next, the operation of the mobile terminal device 1 will be described with reference to FIGS. 7 and 8.

Figure 7:
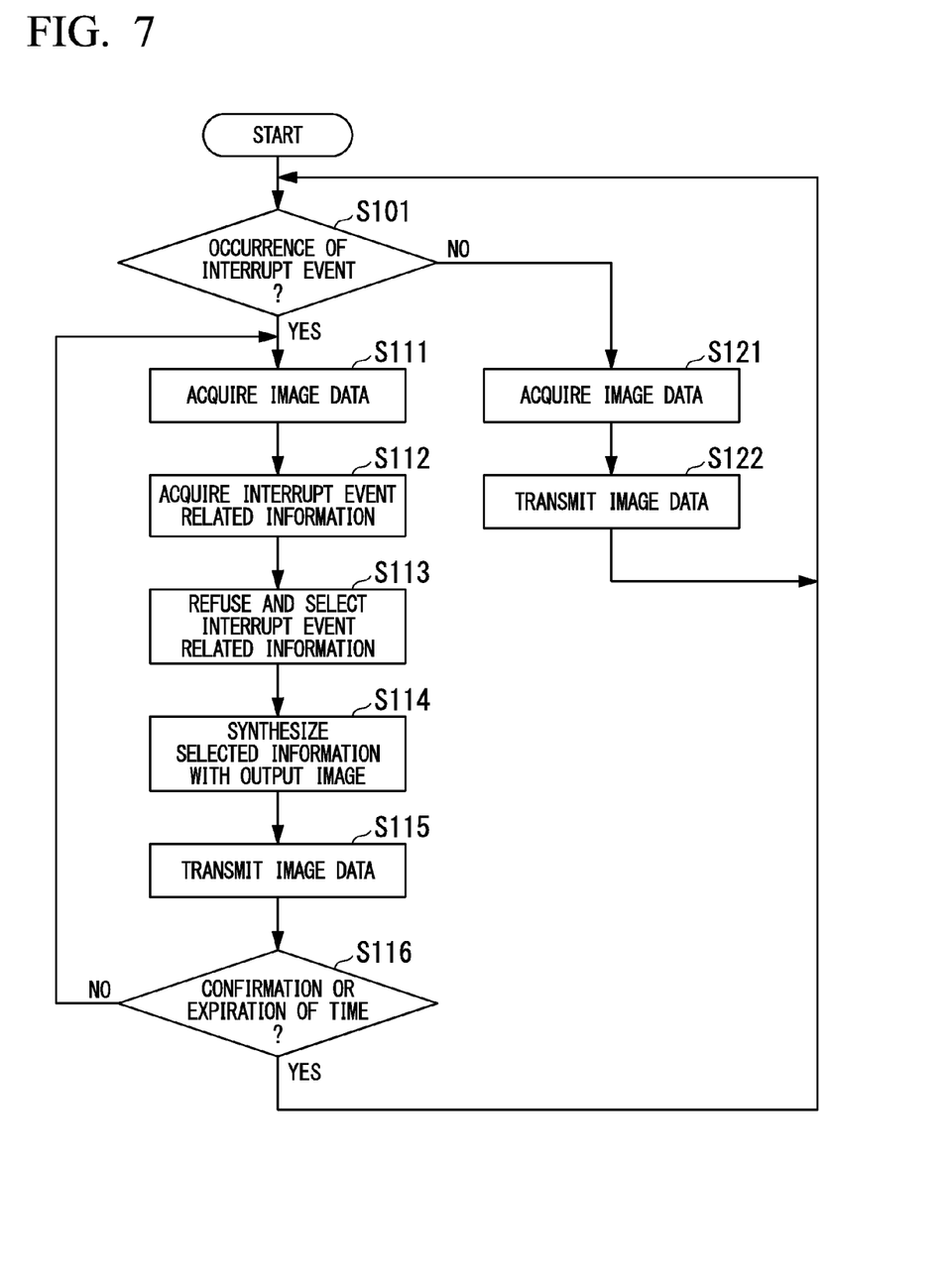
FIG. 7 is a flowchart showing a procedure in which the mobile terminal device of the embodiment displays the information concerning an interrupt event.

FIG. 7 is a flowchart showing the procedure in which, upon the occurrence of an interrupt event, the mobile terminal device 1 controls the display processor 130 to display the information relating to an interrupt event. The mobile terminal device 1 carries out the procedure of FIG. 7 when the mobile terminal device 1 receives a user's operation to transmit the video content to the external display device 19 or when it exits from any event causing interruption of the video content such as a conversation.

In this connection, the mobile terminal device 1 completes the procedure of FIG. 7 due to an interrupt process when the mobile terminal device 1 completes or interrupts transmitting the video content to the external display device 19.

In the procedure of FIG. 7, the interrupt event notice processor 191 determines whether or not an interrupt event occurs (step S101). When the interrupt event notice processor 191 does not determine that any interrupt event occurs (step S101: NO), the image data acquisition part of the mobile terminal device 1 acquires image data (step S121).

To transmit the broadcast content to the external display device 19, for example, the broadcast content acquisition part 111 acquires image data by acquiring the broadcast content. When the video processor 120 takes and transmits images (or live video) to the external display device 19, the video processor 120 produces image data via an imaging process, thus obtaining image data. To transmit the video content stored in the storage unit 180 to the external display device 19, the main controller 190 reads the video content from the storage unit 180, thus obtaining image data.

Thus, the AP communication part 113 transmits the image data obtained in step S121 (e.g. broadcast content data including image data) to the external display device 19 (step S122).

Thereafter, the processing returns to step S101.

When it is determined that an interrupt event occurs in step S101 (step S101: YES), the image data acquisition part of the mobile terminal device 1 acquires image data (step S111) as similar to step S121.

Next, the information selecting part 192 obtains the information relating to an interrupt event (step S112). When an interrupt event indicates reception of a phone call (i.e. reception of a voice communication or reception of a videophone call), the main controller 190 reads originator's address data (i.e. data used in the address book function) from the storage unit 180, and therefore the information selecting part 192 obtains the originator's address data.

Subsequently, the information selecting part 192 selects or refuses the information relating to an interrupt event which is obtained in step S112 (step S113). For example, the information selecting part 192 selects the information, which should be displayed on the external display device 19 as an incoming-call notice, from among the name, the phone number, and the facial photo of an originator based on the presence or absence of a secret setting for the originator's address data, whether or not the external display device 19 is the external display device 19 installed in the user's house, and the type of image data being transmitted to the external display device 19.

Next, the information addition part 193 carries out an addition process (or an image composition process) to add the information selected by the information selecting part 192 in step S113 to the image data transmitted to the external display device 19 (step S114).

Then, the AP communication part 113 transmits the image data obtained in step S114 (e.g. broadcast content data including image data) to the external display device 19 (step S115).

Next, the main controller 190 determines whether a user's operation is carried out to confirm the information relating to an interrupt event or whether or not the predetermined time, which is determined as an interrupt event notice time, has elapsed (step S116).

When it is determined that a user's operation is not carried out while the predetermined time has not elapsed yet (step S116: NO), the processing returns to step S111.

In contrast, when it is determined that a user's operation has been carried out while the predetermined has already elapsed (step S116: YES), the processing returns to step S101.

Figure 8:
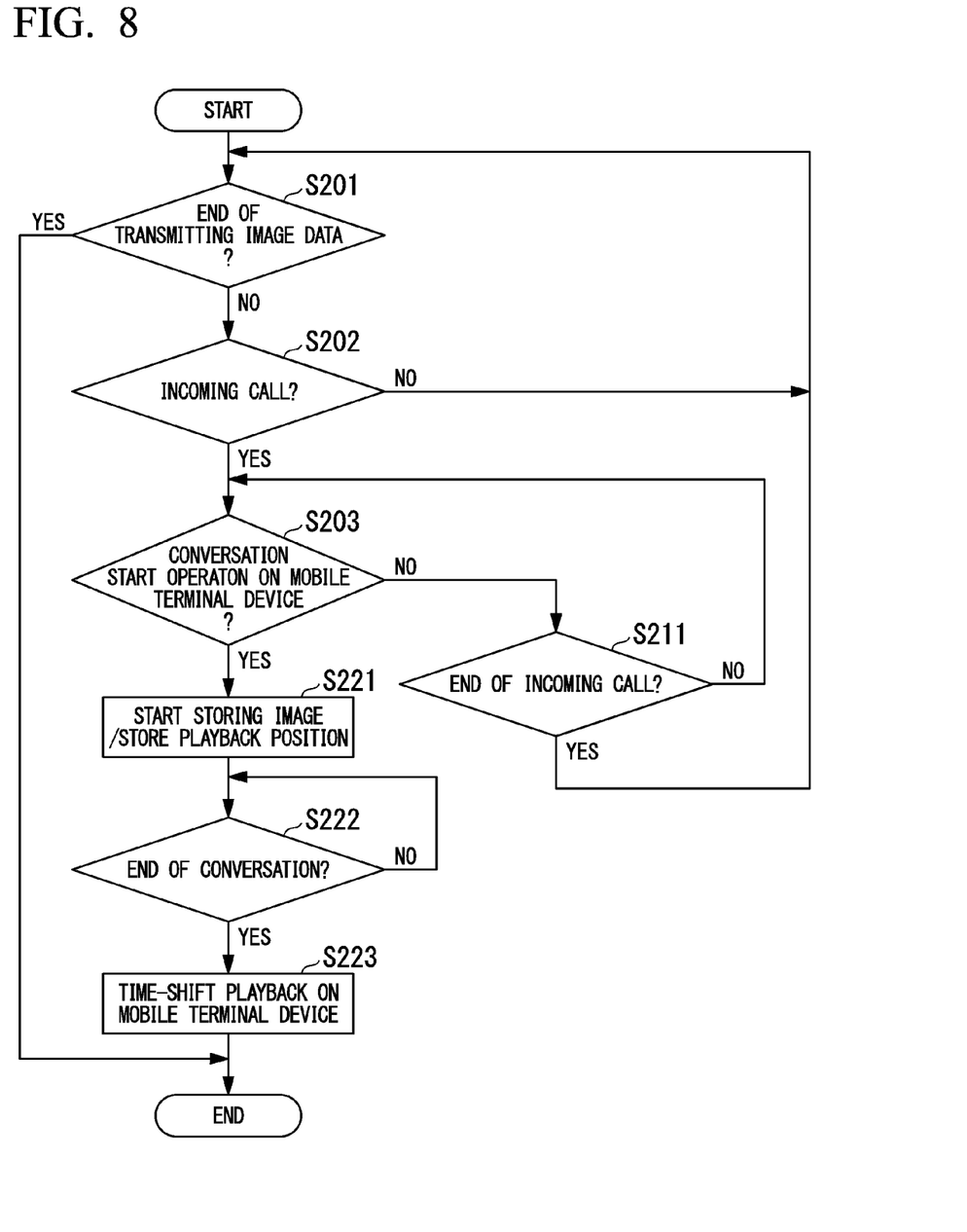
FIG. 8 is a flowchart showing a procedure in which the mobile terminal device of the embodiment carries out a time-shift playback of image data via reception of a conversation.

FIG. 8 is a flowchart showing the procedure in which, upon receiving a phone call, the mobile terminal device 1 carries out a time-shift playback on image data. Upon receiving a user's operation to specify the video content transmitted to the external display device 19, the mobile terminal device 1 starts the procedure of FIG. 8.

In the procedure of FIG. 8, the main controller 190 determines whether or not the transmission of image data to the external display device 19 is completed (step S201). When it is determined that the transmission is completed (step S201: YES), the main controller 190 exits the procedure of FIG. 8.

In contrast, when the main controller 190 determines that the transmission of image data to the external display device 19 has not been completed yet (step S201: NO), the main controller 190 determines whether or not an incoming call is received (step S202).

When it is determined that no incoming call is received (step S202: NO), the processing returns to step S201.

In contrast, when it is determined that an incoming call is received (step S202: YES), the main controller 190 determines whether or not a user's operation is carried out to start a conversation with the mobile terminal device 1 (step S203).

Upon determining that no user's operation is carried out to start a conversation with the mobile terminal device 1 (step S203: NO), the main controller 190 determines whether or not an incoming call is completed (step S211). When it is determined that an incoming call is not completed (step S211: NO), the process returns to step S203.

In contrast, when it is determined that an incoming call is completed (step S211: YES), the process returns to step S201.

When it is determined that a user's operation is carried out to start a conversation with the mobile terminal device 1 in step S203 (step S203: YES), the storage unit 180 starts recording images or stores a playback position (step S221). Specifically, the main controller 190 stores the broadcast content acquired by the broadcast content acquisition part 111 in the storage unit 180 when the mobile terminal device 1 transmits the broadcast content to the external display device 19.

Alternatively, the main controller 190 stores a time-shift playback start position, i.e. a conversation start time or its preceding playback position, in the storage unit 180 when the mobile terminal device 1 transmits the video content, already stored in the storage unit 180, to the external display device 19.

Next, the main controller 190 determines whether or not a conversation is completed (step S222).

When it is determined that a conversation is not completed (step S222: NO), the processing returns to step S222. That is, the main controller 190 waits for completion of a conversation.

When it is determined that a conversation is completed (step S222: YES), the mobile terminal device 1 starts a time-shift playback (step S223).

Specifically, during a time-shift playback of broadcast content, the main controller 190 reads the broadcast content, which is recorded in the storage unit 180, so as to display the broadcast content on the display processor 130. During a time-shift playback of the video content already stored in the storage unit 180, the main controller 190 reads the video content, beginning at the playback position (or a time-shift playback start position) stored in the storage unit 180, from the storage unit 180 so as to display the video content on the display processor 130.

After completion of a time-shift playback, the main controller 190 exits the procedure of FIG. 8.

As described above, the information selecting 192 selects or refuses a plurality of information relating to an interrupt event based on at least one of the attribute of an interrupt event and the attribute of the external display device 19 when an interrupt event occurs during a process of outputting (i.e. transmitting in the present embodiment) image data to the external display device 19. Subsequently, the AP communication part 113 carries out an image composition process to merge the information selected by the information selecting part 192 with the image data supplied to the external display device 19, thus outputting them to the external display device 19.

Thus, it is possible for the mobile terminal device 1 to limit the information displayed on the external display device 19 with respect to the undesired information which the user of the mobile terminal device 1 does not prefer to display or in the environment in which the user of the mobile terminal device 1 does not prefer to display any information.

In this respect, it is possible for the mobile terminal device 1 to appropriately control a display operation concerning an interrupt event on the condition that the mobile terminal device 1 outputs image data to the external display device 19.

Due to the occurrence of an interrupt event based on data supplied from another device outside the mobile terminal device 1, the information selecting part 192 selects or refuses a plurality of information relating to an interrupt event based on the attribute of an interrupt event.

Thus, it is possible for the mobile terminal device 1 to appropriately control the information displayed on the external display device 19 with respect to an interrupt event, which occurs based on data supplied from an external device, such as reception of a phone call.

Additionally, the information selecting part 192 selects or refuses a plurality of information relating to an interrupt event based on the attribute of an interrupt event due to the occurrence of an interrupt event based on any internal event of the mobile terminal device 1.

Thus, it is possible for the mobile terminal device 1 to appropriately control the information displayed on the external display device 19 with respect to an interrupt event, which occurs based on any internal event of the mobile terminal device 1, such as a time-coming event.

Additionally, the information selecting part 192 selects the information suited to an interrupt event from among a plurality of information relating to an interrupt event.

Thus, it is possible for the mobile terminal device 1 to limit the information displayed on the external display device 19 with respect to the undesired information, which the user of the mobile terminal device 1 does not prefer to display, such as the information of a counterpart communicator subjected to a secret setting in the address book function and a schedule subjected to a secret setting in the schedule book function.

In this respect, it is possible for the mobile terminal device 1 to appropriately control a display operation concerning an interrupt event on the condition that the mobile terminal device 1 outputs image data to the external display device 19.

Moreover, the information selecting part 192 selects or refuses a plurality of information relating to an interrupt event based on the attribute of the external display device 19.

Thus, it is possible for the mobile terminal device 1 to limit the information displayed on the external display device 19 in the environment in which the mobile terminal device 1 transmits image data to the external display device 19 installed in the user's house or in the environment in which the mobile terminal device 1 transmits image data to the external display device 19 installed in a company.

In this respect, it is possible for the mobile terminal device 1 to appropriately control a display operation concerning an interrupt event on the condition that the mobile terminal device 1 outputs image data to the external display device 19.

The information addition part 193 may change the manner of displaying the information selected by the information selecting part 192 depending on the display manner of the external display device 19.

For example, the information addition part 193 adjusts the luminance of an image of the added information (i.e. an image representing the information relating to an interrupt event) to be identical to or close to the luminance of an original image (i.e. an image of video content). Thus, the information addition part 193 can add any information without destroying the atmosphere of an original image.

Alternatively, the image addition part 193 may set a different luminance than the luminance of an original image in such a way that the luminance of an image of the added information is reduced to be lower (or darker) than the luminance of an original image. Thus, it is possible to make the added information obvious, and therefore it is possible to reduce a risk that the user may overlook the added information.

Next, the minimum configuration of an electronic device according to the present invention will be described with reference to FIG. 9.

Figure 9:
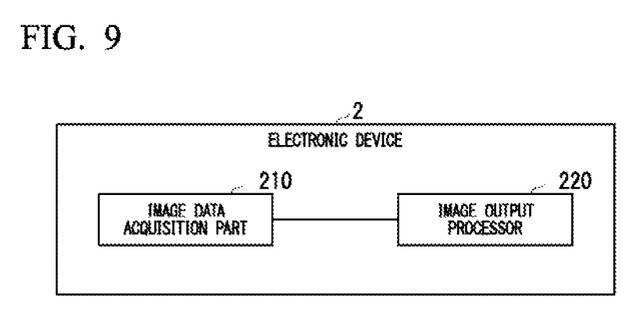
FIG. 9 is a block diagram showing the minimum configuration of an electronic device according to the present invention.

FIG. 9 is a configuration diagram showing the minimum configuration of an electronic device according to the present invention. In FIG. 9, an electronic device 2 includes an image data acquisition part 210 and an image output processor 220.

In this configuration, the image data acquisition part 210 acquires image data. Due to the occurrence of an interrupt event while the electronic device 2 outputs image data to an external display device, the image output processor 220 selects or refuses a plurality of information relating to an interrupt event based on at least one of the attribute of an interrupt event and the attribute of an external display device, thus outputting the selected information to an external display device.

Similar to the foregoing operation of the mobile terminal device 1 described above, it is possible for the electronic device 2 to limit the information displayed on an external display device with respect to the undesired information which the user of the electronic device 2 does not prefer to display or in the environment in which the user of the electronic device 2 does not prefer to display any information.

In this respect, it is possible for the electronic device 2 to appropriately control a display operation concerning an interrupt event on the condition that the electronic device 2 outputs image data to an external display device.

In this connection, the video content of the present invention may embrace various contents including images.

As an interrupt event of the present invention, it is possible to use various interrupt events which the electronic device can detect.

Additionally, the information relating to an interrupt event in the present invention is not necessarily limited to the foregoing examples; hence, it is possible to name various types of information such as text messages of received emails, titles of received emails, the name of a person transmitting new information on the SNS, and the content of new information on the SNS.

In the above, it is possible to store programs, achieving the entirety or part of the functions installed in the mobile terminal device 1 or the electronic device 2 in computer-readable storage media, and then to load and execute the programs stored in storage media into a computer system, thus achieving the functions of the foregoing parts. Herein, the "computer system" may embrace the OS and the hardware such as peripheral devices.

Additionally, the "computer system" using the WWW system may embrace homepage-providing environments (or homepage-displaying environments).

The "computer-readable storage media" may refer to flexible disks, magneto-optic disks, ROM, portable media such as CD-ROM, and storage units such as hard disks installed in computer systems. Additionally, the "computer-readable storage media" may embrace any measures able to dynamically retain programs for a short period of time, e.g. communication lines used to transmit programs such as the Internet and other networks, and telephone lines and other communication lines, as well as other measures able to retain programs for the predetermined time such as non-volatile memory installed in computer systems serving as servers or clients. The foregoing programs can be drafted to achieve part of the foregoing functions, or the foregoing programs can be combined with other programs pre-recorded in any computer system so as to achieve the foregoing functions.

Heretofore, the foregoing embodiment of the present invention is described with reference to the drawings. However, the detailed configurations are not necessarily limited to the foregoing embodiment; hence, it is possible to subsume design changes into the foregoing embodiment without departing from the essential matter of the present invention.

The present application claims priority on Japanese Patent Application No. 2013-44381 filed Mar. 6, 2013, the entire content of which is incorporated herein by reference.

REFERENCE SIGNS LIST

1 mobile terminal device
2 electronic device
111 broadcast content acquisition part
112 mobile communication part
113 AP communication part
120 video processor
130 display processor
140 input processor
150 audio processor
180 storage unit
190 main controller
191 interrupt event notice processor
192 information selecting part
193 information addition part
210 image data acquisition part
220 image output processor

What is claimed is:

1. An electronic device comprising:
an image data acquisition part configured to acquire image data; and
an image output processor configured to output the image data to an external display device,
wherein, when an interrupt event occurs while the image output processor outputs the image data to the external display device, the image output processor selects or refuses a plurality of information relating to the interrupt event based on at least one of an attribute of the interrupt event and an attribute of the external display device, thus outputting selected information to the external display device.

2. The electronic device according to claim 1, wherein the interrupt event is an interrupt event which occurs based on data supplied from an external device outside the electronic device, and wherein the image output processor selects or refuses the plurality of information relating to the interrupt event based on the attribute of the interrupt event.

3. The electronic device according to claim 1, wherein the interrupt event is an interrupt event which occurs based on an internal event of the electronic device, and wherein the image output processor selects or refuses the plurality of information relating to the interrupt event based on the attribute of the interrupt event.

4. The electronic device according to claim 1, wherein the image output processor selects information suiting to the interrupt event from among the plurality of information relating to the interrupt event.

5. The electronic device according to claim 1, wherein the image output processor selects or refuses the plurality of information relating to the interrupt event based on the attribute of the external display device.

6. The electronic device according to claim 1, wherein the image output processor changes a manner of displaying selected information depending on a display manner of the external display device.

7. An image data output processing method adapted to an electronic device, comprising:
an image data acquisition step of acquiring image data;
an image output processing step of outputting the image data to an external display device; and
a step of selecting or refusing a plurality of information relating to an interrupt event based on at least one of an attribute of the interrupt event and an attribute of the external display device when the interrupt event occurs while the image data is being output to the external display device, thus outputting selected information to the external display device.

8. A non-transitory computer-readable storage media storing a program causing a computer of an electronic device to implement an image data output processing method comprising:
acquiring image data;
outputting the image data to an external display device; and
selecting or refusing a plurality of information relating to an interrupt event based on at least one of an attribute of the interrupt event and an attribute of the external display device when the interrupt event occurs while the image data is being output to the external display device, thus outputting selected information to the external display device.

* * * * *

(12) EX PARTE REEXAMINATION CERTIFICATE (132nd)
Ex Parte Reexamination Ordered under 35 U.S.C. 257

United States Patent
Ryo

(10) Number: US 9,601,078 C1
(45) Certificate Issued: Jul. 31, 2018

(54) ELECTRONIC DEVICE AND IMAGE DATA OUTPUT PROCESSING METHOD

(71) Applicant: NEC Corporation, Minato-ku, Tokyo (JP)

(72) Inventor: Sho Ryo, Tokyo (JP)

(73) Assignee: NEC CORPORATION, Minato-ku, Tokyo (JP)

Supplemental Examination Request:
No. 96/000,221, Jul. 3, 2017

Reexamination Certificate for:
Patent No.: 9,601,078
Issued: Mar. 21, 2017
Appl. No.: 14/772,102
PCT Filed: Feb. 18, 2014
PCT No.: PCT/JP2014/053747
§ 371 (c)(1),
(2) Date: Sep. 2, 2015
PCT Pub. No.: WO2014/136564
PCT Pub. Date: Sep. 12, 2014

(30) Foreign Application Priority Data

Mar. 6, 2013 (JP) .................. 2013-044381

(51) Int. Cl.
*H04M 1/72* (2006.01)
*G09G 5/00* (2006.01)
*H04M 1/725* (2006.01)

(52) U.S. Cl.
CPC ........... *G09G 5/003* (2013.01); *H04M 1/7253* (2013.01); *H04M 1/72527* (2013.01); *H04M 1/72597* (2013.01)

(58) Field of Classification Search
CPC ...................................... G09G 5/003
See application file for complete search history.

(56) References Cited

To view the complete listing of prior art documents cited during the supplemental examination proceeding and the resulting reexamination proceeding for Control Number 96/000,221, please refer to the USPTO's public Patent Application Information Retrieval (PAIR) system under the Display References tab.

*Primary Examiner* — Joseph R Pokrzywa

(57) ABSTRACT

An electronic device includes an image data acquisition part configured to acquire image data, and an image output processor configured to output image data to an external display device, wherein, when an interrupt event occurs while the image output processor outputs image data to the external display device, the image output processor selects or refuses a plurality of information relating to an interrupt event based on at least one of the attribute of an interrupt event and the attribute of the external display device, thus outputting the selected information to the external display device.

At the time of issuance and publication of this certificate, the patent remains subject to pending reissue application number 16/008,599 filed Jun. 14, 2018. The claim content of the patent may be subsequently revised if a reissue patent is issued from the reissue application.

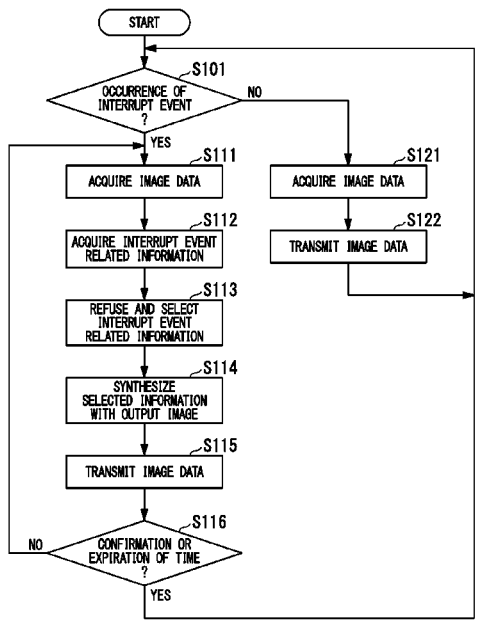

EX PARTE
REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-8 are cancelled.

\* \* \* \* \*

(12) EX PARTE REEXAMINATION CERTIFICATE (181st)
Ex Parte Reexamination Ordered under 35 U.S.C. 257
United States Patent
Ryo

(10) Number: US 9,601,078 C1
(45) Certificate Issued: Nov. 3, 2020

(54) ELECTRONIC DEVICE AND IMAGE DATA OUTPUT PROCESSING METHOD

(71) Applicant: NEC Corporation, Tokyo (JP)

(72) Inventor: Sho Ryo, Tokyo (JP)

(73) Assignee: NEC CORPORATION

Supplemental Examination Request:
No. 96/000,221, Jul. 3, 2017

Reexamination Certificate for:
Patent No.: 9,601,078
Issued: Mar. 21, 2017
Appl. No.: 14/772,102
PCT Filed: Feb. 18, 2014
PCT No.: PCT/JP2014/053747
§ 371 (c)(1),
(2) Date: Sep. 2, 2015
PCT Pub. No.: WO2014/136564
PCT Pub. Date: Sep. 12, 2014

(30) Foreign Application Priority Data

Mar. 6, 2013 (JP) .................................. 2013-044381

(51) Int. Cl.
*H04M 1/72* (2006.01)
*G09G 5/00* (2006.01)
*H04M 1/725* (2006.01)

(52) U.S. Cl.
CPC .......... *G09G 5/003* (2013.01); *H04M 1/7253* (2013.01); *H04M 1/72527* (2013.01); *H04M 1/72597* (2013.01)

(58) Field of Classification Search
CPC ...................................................... G09G 5/003
See application file for complete search history.

(56) References Cited

To view the complete listing of prior art documents cited during the supplemental examination proceeding and the resulting reexamination proceeding for Control Number 96/000,221, please refer to the USPTO's public Patent Application Information Retrieval (PAIR) system under the Display References tab.

*Primary Examiner* — Joseph R Pokrzywa

(57) ABSTRACT

An electronic device includes an image data acquisition part configured to acquire image data, and an image output processor configured to output image data to an external display device, wherein, when an interrupt event occurs while the image output processor outputs image data to the external display device, the image output processor selects or refuses a plurality of information relating to an interrupt event based on at least one of the attribute of an interrupt event and the attribute of the external display device, thus outputting the selected information to the external display device.

At the time of issuance and publication of this certificate, the patent remains subject to pending reissue application number 16/008,599 filed Jun. 14, 2018. The claim content of the patent may be subsequently revised if a reissue patent is issued from the reissue application.

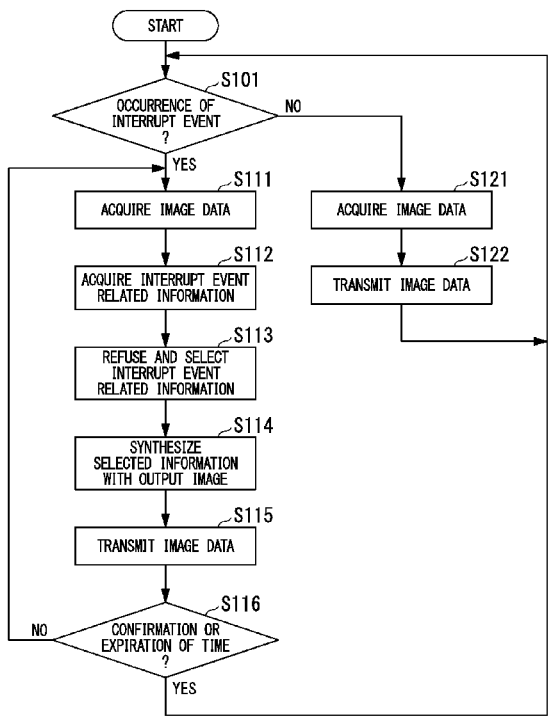

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-8 are cancelled.

\* \* \* \* \*